US012752654B2

(12) United States Patent
Lee et al.

(10) Patent No.: US 12,752,654 B2
(45) Date of Patent: Oct. 6, 2026

(54) THERMAL MANAGEMENT SYSTEM FOR ELECTRIC VEHICLES

(71) Applicants: HYUNDAI MOTOR COMPANY, Seoul (KR); KIA CORPORATION, Seoul (KR)

(72) Inventors: Sang Shin Lee, Suwon-si (KR); Ki Mok Kim, Busan (KR); Man Ju Oh, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 901 days.

(21) Appl. No.: 18/087,332

(22) Filed: Dec. 22, 2022

(65) Prior Publication Data

US 2023/0415593 A1 Dec. 28, 2023

(30) Foreign Application Priority Data

Jun. 22, 2022 (KR) ........................ 10-2022-0075895

(51) Int. Cl.

*H01M 10/613* (2014.01)
*B60L 53/302* (2019.01)
*H01M 10/615* (2014.01)
*H01M 10/625* (2014.01)
*H01M 10/635* (2014.01)
*H01M 10/663* (2014.01)
*B60L 53/16* (2019.01)

(52) U.S. Cl.

CPC ......... *B60L 53/302* (2019.02); *H01M 10/613* (2015.04); *H01M 10/615* (2015.04); *H01M 10/625* (2015.04); *H01M 10/635* (2015.04); *H01M 10/663* (2015.04); *B60L 53/16* (2019.02); *H01M 2220/20* (2013.01)

(58) Field of Classification Search

CPC .... B60L 53/302; B60L 53/16; B60L 2240/34; B60L 2240/36; B60L 2240/545; B60L 2240/662; B60L 2260/28; B60L 53/11; B60L 53/14; B60L 58/26; B60L 58/27; B60L 53/30; H01M 10/613; H01M 10/615; H01M 10/625; H01M 10/635; H01M 10/663; H01M 2220/20; B60H 2001/00928; B60H 2001/00949; B60H 1/00921; B60H 2001/00307; B60H 1/00278; B60H 1/32284; B60H 1/00885; B60H 1/143; B60H 2001/3255; Y02T 10/70; Y02T 10/7072; B60Y 2200/91

See application file for complete search history.

(56) References Cited

U.S. PATENT DOCUMENTS

| | | | | |
|---|---|---|---|---|
| 10,770,815 | B2 | 9/2020 | Färber | |
| 10,807,479 | B2 | 10/2020 | Ryu et al. | |
| 11,180,044 | B2 | 11/2021 | Maeshiro | |
| 11,214,116 | B2 | 1/2022 | Kim et al. | |
| 11,476,511 | B2 | 10/2022 | Lee et al. | |
| 2017/0174037 | A1* | 6/2017 | Meyhofer | H05K 7/20881 |
| 2020/0276879 | A1 | 9/2020 | Kim et al. | |
| 2020/0298718 | A1* | 9/2020 | Bin | B60L 53/22 |
| 2021/0013559 | A1 | 1/2021 | Lee et al. | |
| 2022/0048357 | A1* | 2/2022 | Lee | B60H 1/3211 |
| 2022/0410653 | A1* | 12/2022 | Li | B60H 1/00035 |

FOREIGN PATENT DOCUMENTS

| | | | | |
|---|---|---|---|---|
| KR | 20190036091 | A | 4/2019 | |
| KR | 20210008455 | A | 1/2021 | |
| WO | WO-2020250765 | A1 * | 12/2020 | B60K 11/02 |

* cited by examiner

*Primary Examiner* — Muhammad S Siddiquee
(74) *Attorney, Agent, or Firm* — Lempia Summerfield Katz LLC

(57) ABSTRACT

A thermal management system for electric vehicles has a coolant circulation line provided in a charging station and containing therein a coolant having a predetermined temperature. A connector connects the coolant circulation line and a cooling system of a vehicle. A controller receives an ambient temperature of the vehicle. When a battery of the vehicle is rapidly charged, the controller controls the coolant circulation line of the charging station to be fastened to the cooling system of the vehicle so that the coolant in the charging station enters the cooling system through the connector. The controller controls the coolant overheated or supercooled to the predetermined temperature to be supplied to the vehicle according to a cooling condition or a heating condition of the battery while the vehicle is being charged through the connector.

10 Claims, 7 Drawing Sheets

THERMAL MANAGEMENT SYSTEM FOR ELECTRIC VEHICLES

CROSS REFERENCE TO RELATED APPLICATION

The present application claims priority to Korean Patent Application No. 10-2022-0075895, filed Jun. 22, 2022, the entire contents of which are incorporated herein for all purposes by this reference.

BACKGROUND

Field of the Disclosure

The present disclosure relates generally to a thermal management system for electric vehicles and, more particularly, to a thermal management system configured such that a coolant cooled or heated in a charging station is introduced into a vehicle through a connector provided in the charging station.

Description of the Related Art

In general, a vehicle is provided with an air conditioning system to heat or cool the interior space of the vehicle. The air conditioning system in the vehicle maintains the interior temperature of the vehicle in a suitable temperature range, thereby providing a convenient interior environment.

Such a vehicle air conditioning system is configured to circulate refrigerant. The air conditioning system includes: a compressor compressing refrigerant; a condenser condensing the refrigerant compressed by the compressor; an expansion valve expanding the refrigerant condensed in the condenser; an evaporator cooling air to be blown into the interior space of a vehicle using latent heat of vaporization (or enthalpy of vaporization) of the refrigerant by evaporating the refrigerant expanded in the expansion valve; and the like as major components.

In the air conditioning system, in a cooling mode in the summer, a high-temperature and high-pressure refrigerant in a gas phase compressed by the compressor is condensed in the condenser and is circulated again to the compressor through the expansion valve and the evaporator. Air cooled by heat exchange with the refrigerant in the evaporator is discharged into an interior space of the vehicle, thereby cooling the interior space.

Recently, with increasing interest in energy efficiency and environmental pollution issues, the development of environmentally friendly vehicles capable of substantially replacing internal combustion engine (ICE) vehicles has been conducted. Environmentally friendly vehicles may be categorized as electric vehicles (e.g., fuel cell electric vehicles or FCEVs and battery electric vehicles or BEVs) driven using a fuel cell or a battery as a power source and hybrid vehicles (e.g., hybrid electric vehicles or HEVs and plug-in hybrid electric vehicles or PHEVs) driven using both an engine and a motor as driving sources. Such environmentally friendly vehicles have in common that they are motor driven vehicles (i.e., electrified vehicles) propelled by driving a motor using electricity charged in a battery.

An electric vehicle is provided with a thermal management system for performing overall thermal management of the vehicle. The thermal management system may be defined as a system in a broad sense. The system may include an air conditioning system, a cooling system using a coolant (e.g., cooling water) or a refrigerant for thermal management of an electric power system, and a heat pump system. The cooling system includes components capable of performing the thermal management of the electric power system by cooling or heating a coolant circulating through the electric power system. The heat pump system is used as an auxiliary heating system in addition to an electric heater (e.g., a positive temperature coefficient (PTC) heater) and configured to recover waste heat from power electronic (PE) components, a battery, and the like to use in heating.

A known cooling system includes a cooling circuit and a controller. The cooling circuit includes: a reservoir tank in which a coolant is contained; an electric water pump for circulating the coolant by transferring (i.e., pumping) the coolant; a radiator and a cooling fan for dissipating heat from the coolant; a chiller for cooling the coolant; a coolant heater for heating the coolant; an electric water pump for transferring the coolant; valves for controlling flow of the coolant; and coolant lines connecting the above-mentioned components. The controller controls the temperature and flow of the coolant in the cooling circuit.

The cooling system of an electric vehicle controls the temperatures of the PE components for vehicle driving and of the battery for supplying operating power to the PE components by circulating the coolant through coolant flow paths of the PE components and the battery. In addition, the cooling system may be configured to individually cool the PE components and the battery by separating the PE components and the battery or to integrally cool the PE components and the battery as required. The cooling system may control directions of flow of the coolant by controlling the operation of a three-way valve.

Recently, in order to increase the mileage and fuel efficiency of vehicles, a cooling system for cooling PE components and a battery by separating the PE components and the battery has been developed. In the cooling system, two radiators are disposed in the front part of the vehicle, and parallel coolant lines are provided that circulate through the radiators, respectively.

However, in charging of the electric vehicle, the battery charging efficiency is lowered depending on the ambient temperature. Furthermore, there is a problem in that, when the battery is cooled or heated using the thermal management system provided in a vehicle, efficient charging is impossible.

The foregoing is intended merely to aid in understanding the background of the present disclosure. The foregoing is not intended to mean that the present disclosure falls within the purview of the related art that is already known to those having ordinary skill in the art.

SUMMARY

Accordingly, the present disclosure has been made keeping in mind the above problems occurring in the related art. The present disclosure is intended to propose a thermal management system able to set a charging efficiency temperature of a battery in a vehicle charged using a coolant circulation line provided in a charging station.

In addition, the present disclosure is intended to provide a thermal management system for improving cooling and heating efficiencies of a vehicle, the charging of which is completed, using the temperature of the coolant circulation line of a coolant provided to the vehicle in order to increase the temperature of the battery (or heat the battery).

The objectives of the present disclosure are not limited to the aforementioned description. Other objectives and advantages of the present disclosure not explicitly described should be understood from the description provided hereinafter and, more clearly, from embodiments the present disclosure. In addition, objectives of the present disclosure may be realized by elements described in the claims and combinations thereof.

In order to achieve at least one of the above objectives according to the present disclosure, a thermal management system for electric vehicles includes the following configurations.

According to an embodiment of the present disclosure, a thermal management system for electric vehicles may include: a coolant circulation line provided in a charging station and containing therein a coolant having a predetermined temperature; a connector connecting the coolant circulation line and a cooling system of a vehicle; and a controller receiving an ambient temperature of the vehicle. The controller may be configured to control the coolant circulation line of the charging station to be fastened to the cooling system of the vehicle so that the coolant in the charging station enters the cooling system through the connector when a battery of the vehicle is rapidly charged. The controller may also be configured to control the coolant overheated or supercooled to the predetermined temperature to be supplied to the vehicle according to a cooling condition or a heating condition of the battery while the vehicle is being charged through the connector. The controller may further be configured to activate a cooling mode or a heating mode of the vehicle using heat exchange between the coolant entering the vehicle through the coolant circulation line and the cooling system.

The cooling system may include: a first cooling circuit cooling power electronic components; a second cooling circuit allowing the coolant entering the battery to flow; and an air conditioning system through which a refrigerant circulates.

The thermal management system may further include a chiller provided in the air conditioning system and configured to perform heat exchange among the coolant in the first cooling circuit, the coolant in the second cooling circuit, and the refrigerant in the air conditioning system.

The controller may activate the cooling mode by performing heat transfer from the refrigerant to the second cooling circuit during driving of the vehicle after the battery is cooled through the coolant circulation line when the battery of the vehicle is charged.

The controller may activate the heating mode by performing heat transfer from the second cooling circuit to the refrigerant during driving of the vehicle after the battery is heated through the coolant circulation line when the battery of the vehicle is charged.

A power electronic component provided in the first cooling circuit may include at least one among a front wheel motor, a rear wheel motor, a front wheel inverter, a rear wheel inverter, an on-board charger, and a low voltage direct current to direct current (DC-DC) converter.

The controller may be configured to receive a temperature of the battery in the vehicle and set a temperature of the coolant in the coolant circulation line in response to the received temperature of the battery.

The controller may be configured to receive the ambient temperature of the vehicle and, when the received ambient temperature of the vehicle is higher than the first predetermined temperature, supercool the coolant in the coolant circulation line before injecting the coolant into the vehicle.

The controller may be configured to receive the ambient temperature of the vehicle and, when the received ambient temperature of the vehicle is lower than a second predetermined temperature, overheat the coolant in the coolant circulation line before injecting the coolant into the vehicle.

The thermal management system may further include a low-temperature tank and a high-temperature tank on the coolant circulation line. The supercooled coolant may be contained in the low-temperature tank and the overheated coolant may be contained in the high-temperature tank. The controller may be configured to set a temperature of the coolant according to the ambient temperature.

According to the present disclosure, it is possible to obtain the following effects from the coupling and relation of use between the above-described embodiments and configurations to be described below.

The present disclosure is configured such that, when a battery of a vehicle is charged, a coolant having a set temperature enters the vehicle through a coolant circulation line provided in a charging station. Thus, it is possible to provide a high charging efficiency.

Furthermore, it is possible to perform cooling and heating using the temperature of the coolant provided in the charging station. It is possible to limit an increase in the capacity of the thermal management system of the vehicle, thereby providing an economic effect able to prevent an increase in vehicle cost.

The present disclosure may drive the thermal management system using waste heat of power electronic (PE) components using the integrated chiller, thereby obtaining an effect of increased thermal efficiency.

BRIEF DESCRIPTION OF THE DRAWINGS

The above and other objectives, features, and advantages of the present disclosure should be more clearly understood from the following detailed description when taken in conjunction with the accompanying drawings, in which.

DETAILED DESCRIPTION

Figure 1:
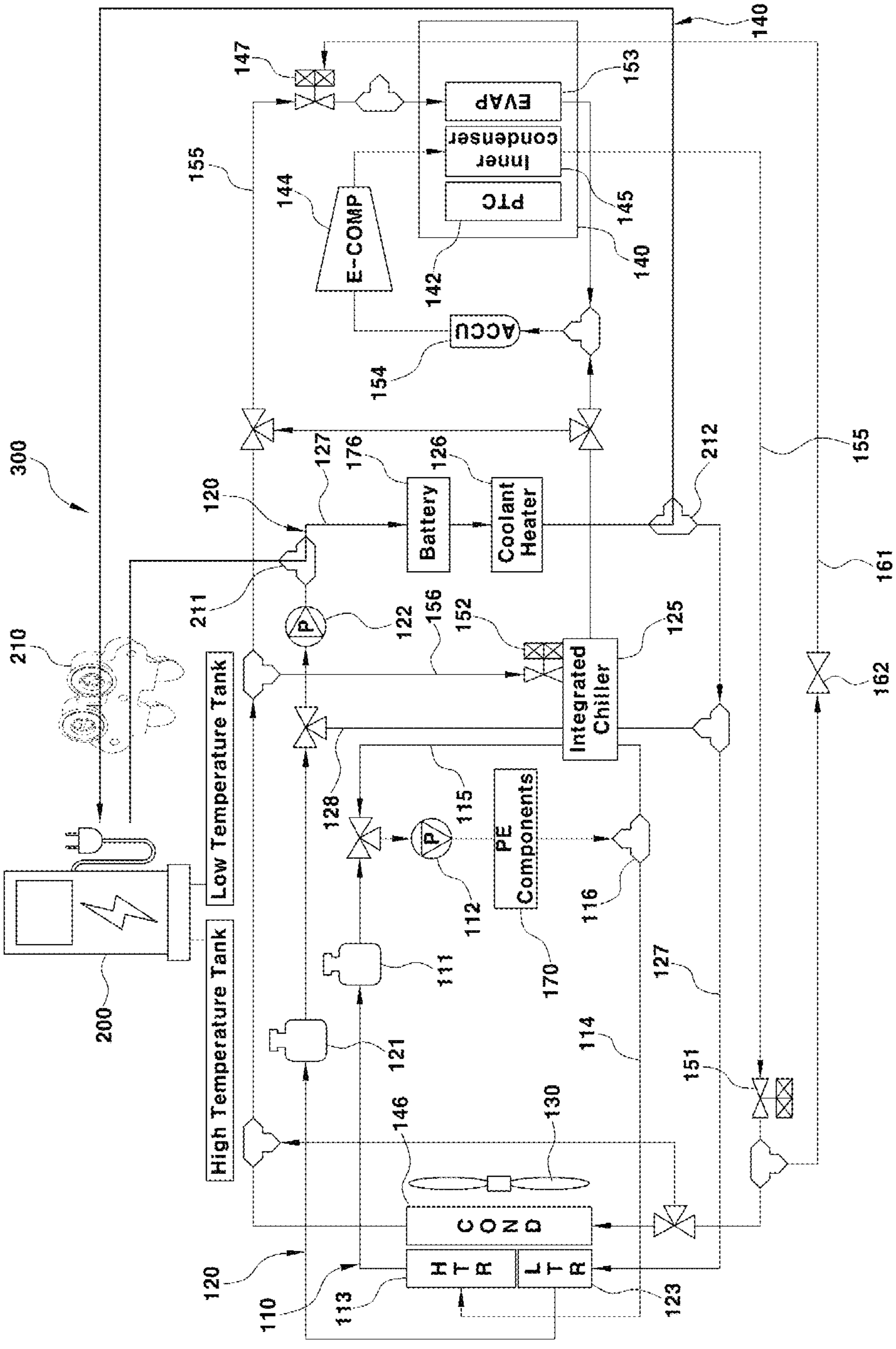
FIG. 1 illustrates a configuration of a thermal management system for electric vehicles according to an embodiment of the present disclosure.

Hereinafter, embodiments of the present disclosure are described in more detail with reference to the accompanying drawings. Embodiments of the present disclosure may be variously modified. The scope of the present disclosure should not be construed as being limited to the embodiments described below. Embodiments are provided to more fully illustrate the present disclosure to those having ordinary skill in the art.

Terms, such as "module," "unit," and "panel," refer to elements respectively performing at least one function or operation. The "module," "unit," "panel," and the like may be realized as hardware or a combination of hardware. When a component, device, element, module, unit, panel, or the like of the present disclosure is described as having a purpose or performing an operation, function, or the like, the component, device, element, module, unit, or panel should be considered herein as being "configured to" meet that purpose or perform that operation or function.

In addition, terms used in the present application are just used to describe a specific embodiment and are not intended to limit the present disclosure. A singular expression may include a plural expression unless the context clearly indicates otherwise.

It should also be understood that, although the terms "first," "second," and the like, may be used herein to describe various elements, these terms are only used to distinguish one element from another element and these elements should not be limited by these terms.

In addition, in the accompanying drawings, dotted lines or solid lines are included to indicate flows of coolant or refrigerant.

Hereinafter, embodiments are described in detail with reference to the accompanying drawings. Throughout the drawings, the same reference numerals and symbols are used to designate the same or like components and repeated descriptions thereof are omitted.

FIG. 1 illustrates a configuration of a thermal management system for electric vehicles according to an embodiment of the present disclosure. FIG. 1 illustrates a cooling circuit including thermal management components, coolant lines 114 and 127 through which a coolant flows, and a refrigerant line 155 through which a refrigerant flows.

As illustrated in FIG. 1, the thermal management system for electric vehicles includes a water cooling system performing thermal management and cooling of power electronic (PE) components that provide vehicle driving force. The cooling system is configured to cool or heat a coolant (e.g., cooling water) circulating through the PE components to manage the heat of a power system. More particularly, the vehicle cooling system according to the present disclosure may include an air conditioning system 140, a first cooling circuit 110, and a second cooling circuit 120.

The cooling system includes a controller (not shown) in addition to the first cooling circuit 110 and the second cooling circuit 120. The cooling circuits 110 and 120 include: reservoir tanks 111 and 121 in which the coolant is contained; electric water pumps 112 and 122 pumping the coolant to circulate; radiators 113 and 123 and a cooling fan 130 dissipating heat from the coolant; a chiller 125 cooling the coolant; a coolant heater 126 heating the coolant; valves 116 controlling flow of the coolant; and the coolant lines 114 and 127 connecting these components. The controller (not shown) controls the temperature and flow of the coolant in the cooling circuits 110 and 120. The controller controls the operation of the electric water pumps 112 and 122 and the coolant heater 126, as well as the operation of an inner heater 142, a compressor 144, a cooling fan 130, an opening/closing door, and the like, which are described below. The controller also controls valves 116, 147, 151, and 162 of the thermal management system. For example, the controller may control the direction of flow of the coolant by controlling the operation of a third valve implemented as a three-way valve. More particularly, the controller may determine whether or not a vehicle is in contact with a charging station 200 to which the vehicle is to be fastened. The controller may control the flow rate of the coolant flowing to the vehicle through a coolant circulation line 300.

The cooling system allows the coolant to flow through coolant flow paths of the PE components 170 for driving the vehicle and through a coolant flow path of the battery 176 supplying operating power to the PE components 170. The cooling system thereby individually or simultaneously controls the temperature of the PE components 170 and the temperature of the battery 176. In addition, the cooling system may be configured, as required, to individually cool the PE components 170 and the battery 176 by separating the PE components 170 and the battery 176 from each other or integrally cool the PE components 170 and the battery 176.

In the thermal management system illustrated in FIG. 1, the cooling system is a parallel separate cooling system configured to increase the mileage and fuel efficiency of the vehicle. In the cooling system, the two radiators 113 and 123 are disposed on the front part of the vehicle. The parallel coolant lines 114 and 127 are provided to circulate respective radiators, such that the PE components 170 and the battery 176 may be separately cooled.

The PE components 170 to be cooled may include: a front wheel motor and a rear wheel motor serving as vehicle driving sources; a front wheel inverter and a rear wheel inverter driving and controlling the front wheel motor and the rear wheel motor, respectively; an on-board charger (OBC) charging the battery 176; and a low voltage direct current to direct current (DC-DC) converter (LDC).

Referring to FIG. 1, it can be appreciated that the coolant lines 114 and 127 are connected to the two radiators, i.e., the first radiator 113 and the second radiator 123, respectively. The first radiator 113 and the second radiator 123 dissipate heat from the coolant circulating through the respective coolant lines 114 and 127 by heat exchange between the ambient air drawn by the cooling fan 130 and the coolant in the respective radiators, thereby cooling the coolant.

In the parallel separate cooling system, the first radiator 113 is a high-temperature radiator and the second radiator 123 is a low-temperature radiator, depending on the operating temperature (or the temperature of the coolant). The first radiator 113 dissipates heat from the coolant having a relatively high temperature to cool the coolant by allowing the coolant to flow therethrough. The second radiator 123 performs heat dissipation and cooling by allowing the coolant having a relatively low temperature to flow therethrough. The second radiator 123 serving as the low-temperature radiator may be disposed upstream of the first radiator 113 serving as the high-temperature radiator.

The first radiator 113, the first reservoir tank 111, and the PE components 170, such as the front wheel inverter, the rear wheel inverter, the OBC, the LDC, the rear wheel motor, and the front wheel motor, are connected through the first coolant line 114, such that the coolant may circulate therethrough. In addition, the first electric water pump 112 pumping the coolant to circulate, a first bypass line 115 connecting the rear end and the front end of each of the PE components 170, and the valve 116 positioned at the rear ends of the PE components 170 to selectively allow the coolant to flow to the first radiator 113 are disposed on the first coolant line 114. The valve 116 may be a three-way valve capable of flow rate distribution. In this manner, the first cooling circuit 110 cooling the PE components 170 by circulating the coolant through the first coolant line 114 is configured. The PE components cooled by the first cooling circuit 110 may include at least one of the vehicle drive motors, the inverters for driving the motors, the OBC for charging the battery, and the LDC.

In the first cooling circuit 110, the coolant pumped by the first electric water pump 112 sequentially passes through the PE components, such as the front wheel inverter, the OBC, the LDC, the rear wheel motor, and the front wheel motor. While passing through the PE components 170, the coolant sequentially cools the respective PE components 170. The high-temperature coolant that has cooled the PE components 170 is cooled by heat exchange and heat dissipation to the ambient air while passing through the first radiator 113.

The second radiator 123, the second reservoir tank 121, the battery 176, the coolant heater 126, and the chiller 125 are connected through the second coolant line 127, such that the coolant may circulate therethrough. The battery 176 supplies operating power to the PE components, such as the front wheel motor and the rear wheel motor. In this regard, the battery 176 is connected to the PE components 170 through electrical wiring although the electrical wiring is not shown in the figures. For example, the battery 176 is connected to the front wheel motor and the rear wheel motor through the front wheel inverter and the rear wheel inverter, respectively, in a chargeable and dischargeable manner. In addition, the battery 176 is connected to the OBC and the LDC through the electrical wiring.

In addition, the electric water pump 122 pumping the coolant to circulate is disposed on the second coolant line 127. The second coolant line 127 includes a second bypass line 128 connecting the coolant lines on the front and rear ends of the second radiator 123 and configured such that heat exchange may be performed through the chiller 125. In this manner, the second cooling circuit 120 is configured to cool the battery 176 by circulating the coolant through the second coolant line 127. In the second cooling circuit 120, a plurality of electric water pumps, i.e., a plurality of second electric water pumps 122, may be disposed on the second coolant line 127.

In the second cooling circuit 120, the coolant pumped by the electric water pump 122 passes through the battery 176 while circulating through the second coolant line 127. The battery 176 is cooled while the coolant is passing through the battery 176. In addition, the high-temperature coolant that has cooled the battery 176 is cooled by heat exchange with, and heat dissipation to, the air while passing through the second radiator 123.

The temperature of the coolant that has cooled the battery 176 as described above is lower than the temperature of the coolant that has cooled the PE components 170. Thus, the second radiator 123 dissipating heat from the coolant, having a relatively low temperature, may be referred to as a low-temperature radiator, whereas the first radiator 113 dissipating heat from the coolant, having a relatively high temperature, may be referred to as a high-temperature radiator.

In FIG. 1, the coolant heater 126 is disposed on the second coolant line 127 and positioned at a discharge end of the battery 176. The coolant heater 126 is turned on when an increase in the temperature of the battery 176 (i.e., heating the battery 176) is requested. The coolant heater 126 heats the coolant circulating through the second coolant line 127, so that the heated coolant may enter the coolant flow path in the battery 176. The coolant heater 126 may be an electric heater operating using power supplied thereto.

The thermal management system according to the present disclosure may include the air conditioning system 140. The air conditioning system 140 includes: the compressor 144 compressing the coolant; an outer condenser 146 condensing the coolant compressed by the compressor 144; a first expansion valve 147 rapidly expanding the coolant condensed in the outer condenser 146; an evaporator 153 cooling the air blown into the vehicle interior using latent heat of vaporization (or enthalpy of vaporization) of the coolant by evaporating the coolant expanded in the first expansion valve 147; and the like as major components.

The outer condenser 146 is disposed in the front part of the vehicle and configured such that the ambient air passes therethrough. In this case, the inner condenser 145 is disposed downstream of the evaporator 153 within an air conditioning housing. Thus, the air blown by an air conditioning blower (not shown) may be discharged into the vehicle interior after sequentially flowing through the evaporator 153 and the inner condenser 145. The inner heater 142 is implemented as a positive temperature coefficient (PTC) heater and is configured to selectively operate to heat the interior space.

Thus, in a heating mode, the air blown by the air conditioning blower may be heated by operating the inner heater 142 and then discharged into the vehicle interior space, thereby heating the vehicle interior space. In contrast, in a cooling mode, the air blown by the air conditioning blower may be cooled in the evaporator 153 (by heat exchange with the coolant) by circulating the coolant by operating the compressor 144 and then discharged into the vehicle interior space, thereby heating the vehicle interior space. Alternatively, the heating mode may be configured so that the air is discharged into the vehicle interior space based on the coolant that has been subjected to heat exchange with the second cooling circuit 120.

In addition, an opening/closing door is disposed between the evaporator 153 and the inner condenser 145 within the air conditioning housing. The opening/closing door selectively opens or closes a path extending through the inner condenser 145. In the vehicle heating mode, the opening/closing door is operated to be opened so that the air passed through the evaporator 153 passes through the inner condenser 145 and the inner heater 142. In the vehicle cooling mode, the opening/closing door closes the inner condenser 145 side and the inner heater 142 side so that the air that has been cooled while passing through the evaporator 153 is directly discharged into the vehicle interior space instead of passing through the inner condenser 145 and the inner heater 142.

In the air conditioning system 140, the compressor 144, the outer condenser 146, the first expansion valve 147, and the evaporator 153 are connected through the refrigerant line 155 such that a refrigerant circulates therethrough. The outer condenser 146 may be disposed upstream of the first radiator 113 and the second radiator 123 in the front part of the vehicle. In addition, an accumulator 154 may be disposed between the compressor 144 and the evaporator 153 on the refrigerant line 155. In addition, the inner condenser 145 may be connected to the outer condenser 146 through the refrigerant line 155, whereas the inner condenser 145 may be disposed on the refrigerant line 155 between the compressor 144 and the outer condenser 146. Furthermore, a separate flow path may be provided upstream of the outer condenser 146 to bypass the outer condenser 146. The inner condenser 145 may be disposed downstream of the evaporator 153 or upstream of the inner heater 142 within the air conditioning housing. Referring to FIG. 1, it can be appreciated that the inner condenser 145 is disposed between the evaporator 153 and the inner heater 142.

As a result, in the air conditioning system 140, the refrigerant sequentially circulates through the compressor 144, the inner condenser 145, the outer condenser 146, the first expansion valve 147, the evaporator 153, the accumulator 154, and the compressor 144. The compressor 144 is disposed on the refrigerant line 155 between the inner condenser 145 and the evaporator 153 to compress the refrigerant in a gaseous state into a high-temperature and a high-pressure state. The accumulator 154 is disposed on the refrigerant line 155 between the compressor 144 and the evaporator 153 and allows only the refrigerant in the gaseous state to be supplied to the compressor 144. The efficiency and durability of the compressor 144 are thereby improved.

The outer condenser 146 is connected to the inner condenser 145 through the refrigerant line 155. The outer condenser 146 receives the compressed refrigerant supplied from the compressor 144 through the inner condenser 145 and condenses the received compressed refrigerant by heat exchange with the ambient air drawn by the cooling fan 130. The first expansion valve 147 receives the refrigerant condensed in the outer condenser 146 and expands the received condensed refrigerant. The low-temperature and low-pressure refrigerant passed through the first expansion valve 147 are supplied to the evaporator 153. Thus, heat exchange occurs between the refrigerant expanded in the first expansion valve 147 in the evaporator 153 and the air blown by the air conditioning blower. The air cooled by the heat exchange is discharged into the vehicle interior space, thereby cooling the interior space. The first expansion valve 147 may be a solenoid integrated expansion valve.

The thermal management system according to a comparative embodiment includes the chiller 125 simultaneously or selectively performing heat exchange of the refrigerant in the air conditioning system 140 with flows of coolant circulating through the second coolant line 127 and the first coolant line 114 to cool the battery 176. The chiller 125 may be disposed on the second coolant line 127, the refrigerant line 155, and the first bypass line 115. More specifically, the chiller 125 may be disposed on the refrigerant line 155 of the air conditioning system 140. Furthermore, the chiller 125 is configured such that the second coolant line 127 for cooling the first bypass line 115 and the battery 176 passes therethrough. The chiller 125 has a configuration by which the refrigerant may perform heat exchange with one or both of the coolant for cooling the PE components 170 and the coolant for controlling the temperature of the battery 176.

The branch refrigerant line on which the chiller 125 is disposed may be a branch line branched from the refrigerant line 155 between the outer condenser 146 and the first expansion valve 147 to be connected to the evaporator 153 and the accumulator 154. A refrigerant inlet of the chiller 125 is connected to the refrigerant line 155 between the outer condenser 146 and the first expansion valve 147. In addition, a refrigerant outlet of the chiller 125 is connected to the evaporator 153 and the accumulator 154 through an outlet-side branch refrigerant line. An inlet-side branch refrigerant line of the chiller 125 is a branch refrigerant line 156 branched from the refrigerant line 155 between the outer condenser 146 and the first expansion valve 147 to be connected to the refrigerant inlet of the chiller 125. The outlet-side branch refrigerant line is a branch refrigerant line branched from (a portion between) the evaporator 153 and the accumulator 154 to be connected to the refrigerant outlet of the chiller 125.

A third expansion valve 152 may be disposed on the branch refrigerant line 156 adjacent to the refrigerant inlet or outlet. In the cooling mode, the third expansion valve 152 expands the refrigerant entering the chiller 125 through the inlet-side branch refrigerant line 156 branched from the refrigerant line 155. The temperature of the refrigerant that entered the third expansion valve 15 through the inlet-side branch refrigerant line 156 is lowered along with the expansion of the refrigerant. In this state, the refrigerant may enter the chiller 125. Consequently, the refrigerant condensed in the outer condenser 146 enters the third expansion valve 152 from the refrigerant line 155 through the inlet-side branch refrigerant line 156, and the refrigerant in a low-temperature and low-pressure state that expanded while passing through the third expansion valve 152 enters the chiller 125. Subsequently, the refrigerant passes through the inside of the chiller 125 and then is discharged again to the refrigerant line 155 through the outlet-side branched refrigerant line.

As described above, the chiller 125 is disposed on the branch refrigerant line 156 that is branched to enable heat exchange among the second coolant line 127, the first bypass line 115, and the refrigerant line 155. Consequently, heat exchange may occur between the coolant and the refrigerant passing through the inside of the chiller 125. The coolant cooled or heated by heat exchange with the refrigerant in the chiller 125 may circulate through the cooling circuits 110 and 120. The battery 176 may be cooled by the cooled coolant in the second cooling circuit 120.

Furthermore, the thermal management system may further include a heat exchanger (not shown) disposed between the first coolant line 114 and the refrigerant line 155 and between the second coolant line 127 and the refrigerant line 155. The heat exchanger may be provided to allow heat exchange between the coolant and the refrigerant, i.e., a heat exchanger (not shown) disposed on the second coolant line 127 to allow heat exchange between the coolant and the refrigerant, in addition to the chiller 125.

A location of the first coolant line 114 on which the heat exchanger is disposed may be a coolant line portion through which the coolant passed through the PE components 170 flows toward the first radiator 113, i.e., a coolant line portion upstream of the radiator connected from the PE components 170 to the inlet of the first radiator 113. In addition, a location of the second coolant line 127 on which the heat exchanger is disposed may be a coolant line portion through which the coolant passed through the chiller 125 flows toward the second radiator 123, i.e., a coolant line portion upstream of the radiator connected from the chiller 125 to the inlet of the second radiator 123.

In addition, a location of the refrigerant line 155 on which the heat exchanger is disposed may be a refrigerant line portion between the inner condenser 145 and the outer condenser 146. The inlet of the heat exchanger may be connected to the inner condenser 145 through the refrigerant line 155, whereas the outlet of the heat exchanger may be connected to the outer condenser 146 through the refrigerant line 155.

In addition, the second expansion valve 151 may be disposed on the inlet-side refrigerant line 155 connected to the inlet of the heat exchanger. A dehumidification line 161 may be branched from the inlet-side refrigerant line 155 to be connected to the refrigerant line 155 between the first expansion valve 147 and the evaporator 153. A location on which the dehumidification line 161 branches from the inlet-side refrigerant line 155 may be a refrigerant line portion between the inlet of the heat exchanger and the second expansion valve 151. Thus, the dehumidification line 161 is a separate refrigerant line connected from the refrigerant line 155 between the inlet of the heat exchanger and the second expansion valve 151 to the refrigerant line 155 between the first expansion valve 147 and the evaporator 153.

According to the present disclosure, the coolant circulation line 300, which allows the coolant to be supplied from the charging station 200 therethrough, is provided from the charging station 200. The coolant circulation line 300 may be connected to the second coolant line 127 by a connector 210 configured to fasten the vehicle and the charging station 200. More particularly, the connector 210 is configured such that a connector inlet 211 is positioned between the rear end of the electric water pump 122 and the battery 176 and a connector outlet 212 is positioned between the coolant heater 126 and the second radiator 123. Thus, the coolant entering from the charging station 200 through the connector inlet 211 performs heat exchange with the battery 176 at a temperature corresponding to the charging efficiency temperature of the battery 176. After passing through the coolant heater 126, the coolant circulates to the charging station 200 through the connector outlet 212.

The temperature of the coolant positioned in the coolant circulation line 300 may be maintained to correspond to the charging efficiency temperature of the battery 176, based on an ambient air sensor (not shown) provided in the charging station 200. More particularly, the temperature of the battery 176 of the vehicle is measured using a temperature sensor (not shown) of the vehicle. A controller of the charging station 200 may be configured to receive the measured temperature of the battery 176 and set the temperature of the coolant in the coolant circulation line 300 by setting coolant temperatures matching individual vehicles. More particularly, the controller may be configured to perform the charging of the battery 176 by flowing the coolant so that the battery 176 of the vehicle has a temperature in the range from 15° C. to 40° C. as the charging efficiency temperature of the battery 176.

Thus, when the ambient temperature is determined to be higher than a first set temperature, the controller performs supercooling so that the temperature of the coolant positioned in the coolant circulation line 300 is equal to or lower than in order to cool the battery 176. The battery 176 of the vehicle is fastened to the coolant circulation line 300 through the connector 210. The coolant circulates through the second cooling circuit 120 so that the temperature of the battery 176 is a charging optimal temperature. More particularly, the temperature range of the coolant may be set to range from 0° C. to ° C. as the charging optimal temperature. Furthermore, it is configured such that the coolant flowing through the second cooling circuit 120 cools the refrigerant through the chiller 125. The cooling mode may be activated by cooling the refrigerant flowing through the air conditioning system 140. In other words, the supercooled coolant in the coolant circulation line 300 cools the refrigerant through the chiller 125. The air conditioning system 140 using the refrigerant is configured to perform the cooling of the vehicle without additionally cooling the refrigerant.

Furthermore, when the ambient temperature is determined to be lower than a second set temperature, the controller supercools the coolant positioned in the coolant circulation line 300 so that the temperature of the coolant is 30° C. or higher in order to increase the temperature of (or heat) the battery 176. The battery 176 of the vehicle is fastened to the coolant circulation line 300 through the connector 210. The coolant having a set temperature enters the second cooling circuit 120 so that the temperature of the battery 176 is 30° C. or higher. Furthermore, the coolant flowing through the second cooling circuit 120 increases the temperature of the refrigerant through the chiller 125. Thus, the heating mode is activated by increasing the temperature of the refrigerant flowing through the air conditioning system 140. In other words, the overheated coolant in the coolant circulation line 300 may increase the temperature of the refrigerant through the chiller 125 and the air conditioning system 140 using the refrigerant may perform the heating of the vehicle without additional heating.

As described above, the coolant circulation line 300 is fluid-connected to the vehicle through the connector 210. The coolant having a predetermined temperature, contained in the charging station 200, enters the second cooling circuit 120 to cool or heat the battery 176. At the same time, the coolant cools or heats the refrigerant, so that cooling/heating air conditioning of the air conditioning system 140 is performed.

In other words, the controller according to the present disclosure is configured to set the temperature of the coolant that is provided to the vehicle while the charging is being performed. The controller is also configured to supply the coolant, having a predetermined high- or low-temperature, to the vehicle according to the cooling or heating condition through the connector 210 while the battery 176 of the vehicle is being charged.

More particularly, the reservoir tanks for the coolant contained in the charging station 200 may include a low-temperature tank and a high-temperature tank. The temperature of the coolant contained in the low-temperature tank may be set to a temperature range from 0° C. to 5° C., whereas the temperature of the coolant contained in the high-temperature tank may be set to a temperature range from 45° C. to 50° C. Thus, the controller is configured to measure the temperature of the vehicle and set the temperature of the coolant in the low-temperature tank and/or the high-temperature tank in response to the measured temperature. Thus, the coolant having the set temperature flows through the coolant circulation line 300.

As described above, the present disclosure is configured such that the coolant having the temperature set to the charging efficiency temperature range enters the second cooling circuit 120 of the vehicle through the connector 210 from the high-temperature tank and the low-temperature tank on the coolant circulation line 300. Thus, the present disclosure increases the charging efficiency when charging the battery 176. Thus, the battery 176 having an immediate charging efficiency temperature may be provided, in comparison to the thermal management system of the related art for controlling the temperature of the coolant through the coolant heater 126 or chiller 125 of the thermal management system for vehicles when charging the battery 176.

Figure 2:
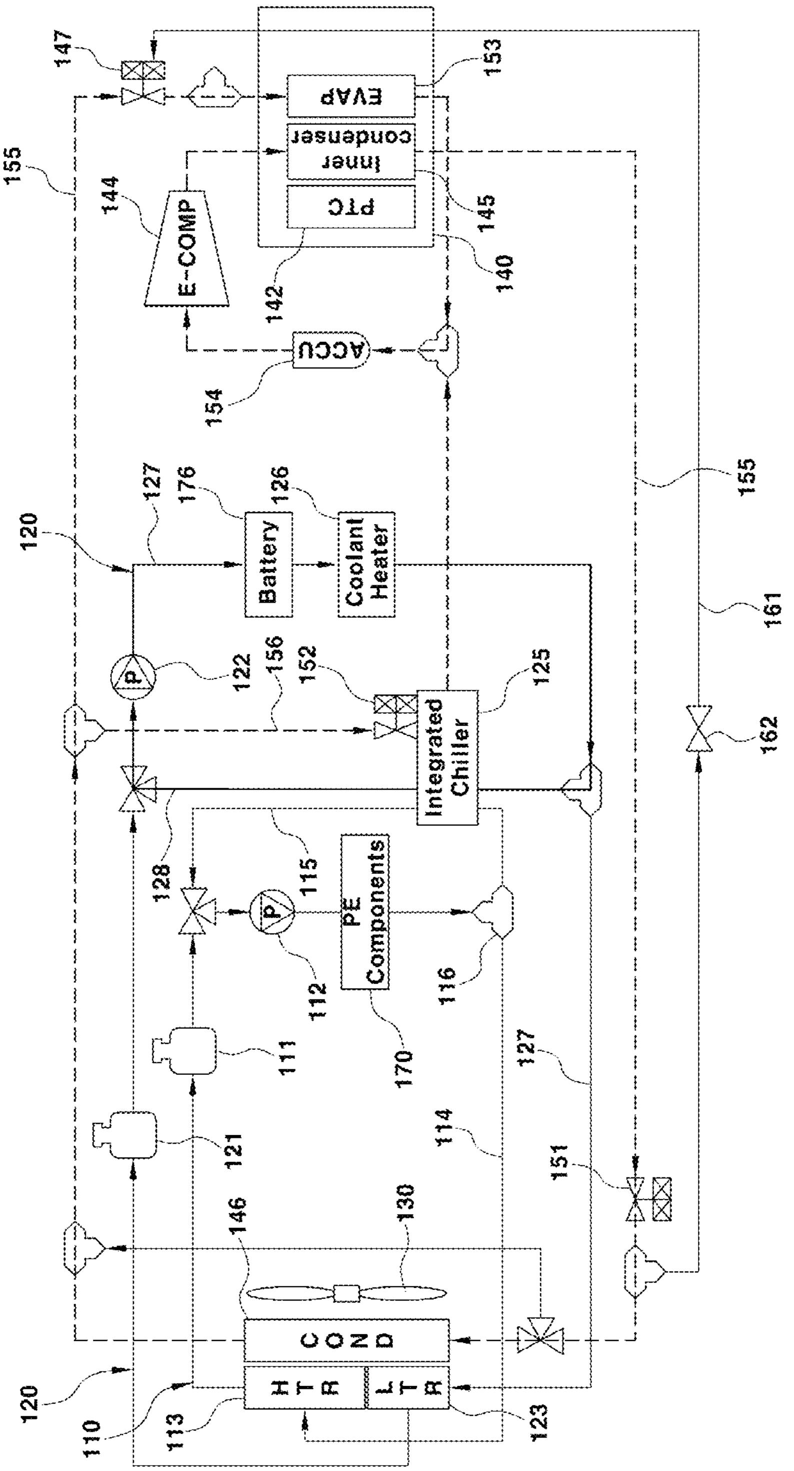
FIG. 2 illustrates a battery cooling mode of an independent thermal management system not charged with a coolant from a charging station as a related-art example.

FIG. 2 illustrates an operating state according to a cooling mode in a driving environment after charging in a thermal management system of the related art.

FIG. 2 illustrates an operating state of the thermal management system in the cooling mode of the vehicle. The coolant circulates through the first cooling circuit 110 and the second cooling circuit 120. Through the circulation of the coolant, the PE components 170, such as the front wheel inverter, the rear wheel inverter, the OBC, the LDC, the front wheel motor, the rear wheel motor, and the battery 176 are cooled.

In addition, the air conditioning system 140 operates to cool the vehicle interior space. While the compressor 144 is operating during the cooling, the refrigerant circulates through the refrigerant line 155. The refrigerant is compressed into a high-temperature and high-pressure state by the compressor 144 and then sequentially passes through the components in the sequence from the inner condenser 145 to the outer condenser 146. The refrigerant is condensed while passing through the heat exchanger and the outer condenser 146. Subsequently, the condensed refrigerant is expanded into a low-temperature and low-pressure state while passing through the first expansion valve 147. The refrigerant expanded into the low-temperature and low-pressure state passes through the evaporator 153 and then circulates again to the compressor 144 through the accumulator 154. Furthermore, at least a portion of the refrigerant circulates again to the compressor 144 by passing through the chiller 125 and the accumulator 154. While the refrigerant is passing through the evaporator 153 in this manner, heat exchange occurs between the air blown by the air conditioning blower and the refrigerant in the evaporator 153. While the refrigerant is being evaporated in the evaporator 153, the air is cooled by the latent heat of vaporization of the refrigerant. Consequently, the cooled air is discharged into the vehicle interior space, thereby cooling the vehicle interior space.

As described above, in the cooling mode, the refrigerant enters the chiller 125 through the branch refrigerant line 156. The entered refrigerant circulates through the refrigerant line 155 connecting the compressor 144, the inner condenser 145, the outer condenser 146, the first expansion valve 147, the evaporator 153, and the accumulator 154. The refrigerant compressed into the high-temperature and high-pressure state by the compressor 144 is cooled and condensed by the coolant in the first cooling circuit 110 and the second cooling circuit 120. In addition, the refrigerant compressed into high-temperature and high-pressure state by the compressor 144 maintains the high-pressure state before passing through the first expansion valve 147 after passing through the outer condenser 146. The refrigerant is also converted into a low-temperature and low-pressure state by the first expansion valve 147 and then is supplied to the evaporator 153. The refrigerant passed through the evaporator 153 in the low-pressure state is circulated to the compressor 144 through the accumulator 154. Furthermore, the refrigerant entering the chiller 125 through branch refrigerant line 156 at the front end of the first expansion valve 147 circulates through the accumulator 154 and the compressor 144.

In other words, in the cooling mode, a portion of the refrigerant passed through the outer condenser 146 is distributed to the branch refrigerant line 156 to be supplied to the chiller 125. The refrigerant is converted into a low-temperature and low-pressure state before entering the chiller 125. In the chiller 125, heat exchange occurs between the refrigerant having the low-temperature and low-pressure state and the coolant in the second cooling circuit 120. Thus, the coolant in the second cooling circuit 120 may be cooled by the refrigerant in the chiller 125. The coolant cooled at this time may be used to cool the battery 176.

In other words, it should be appreciated that, in the related art, both the cooling of the refrigerant and the cooling of the battery 176 overheated by rapid charging should be performed simultaneously. The amount of power consumed in driving the outer condenser 146, the cooling fan, the inner condenser 145, and the like is thereby increased.

Figure 3:
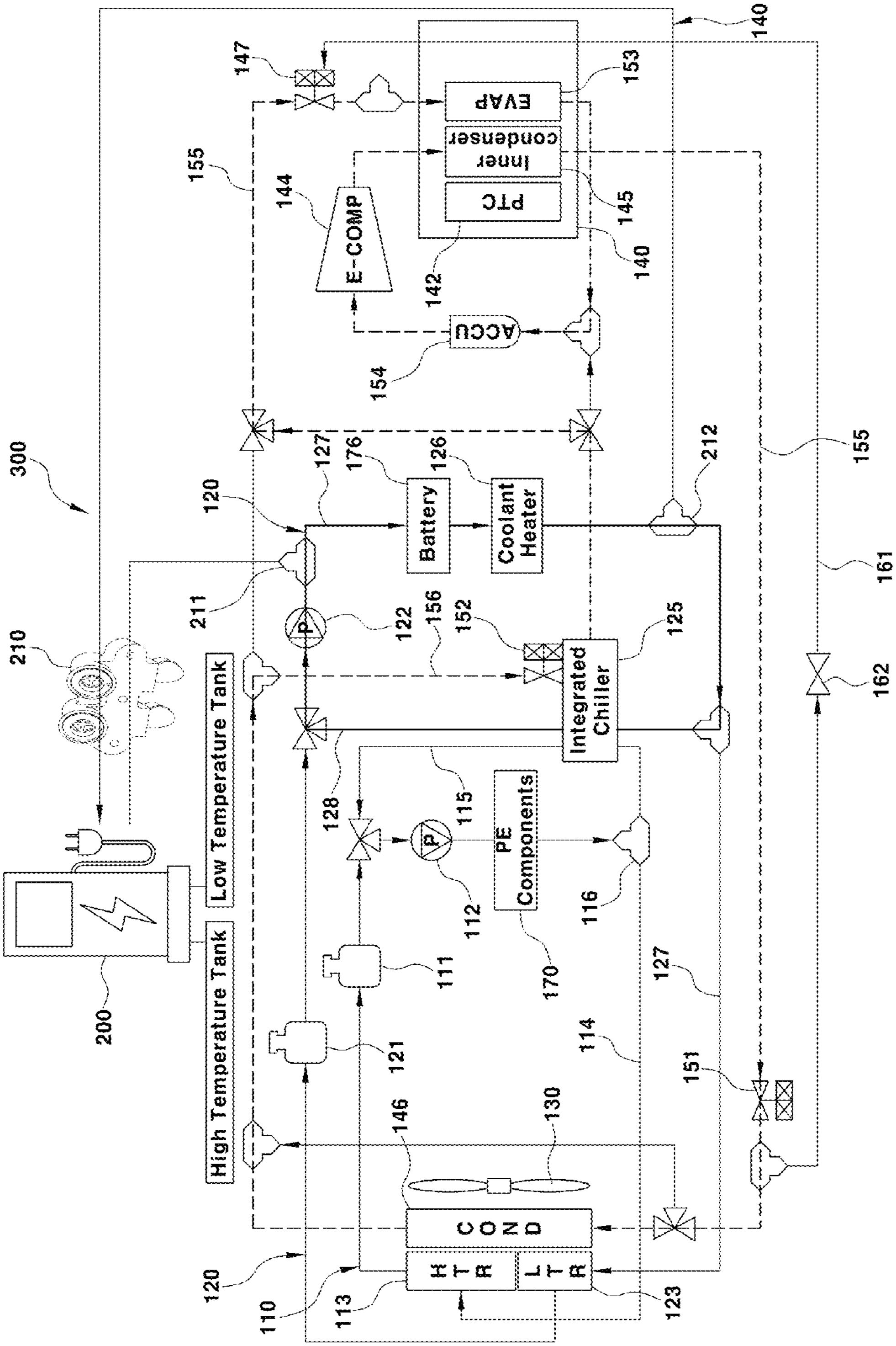
FIG. 3 illustrates flows of the thermal management system for improving cooling performance and air conditioning efficiency using the supercooled battery according to an embodiment of the present disclosure.

FIG. 3 illustrates a cooling mode in driving after the coolant is injected into the second cooling circuit 120 through the coolant circulation line 300 of the charging station 200 or the injection is completed.

As illustrated in FIG. 3, when the ambient temperature is higher than the first set temperature, the controller sets the coolant flowing through the coolant circulation line 300 to a supercooled state. The battery 176 may maintain the supercooled state due to the coolant of the charging station 200 injected through the coolant circulation line 30. The second cooling circuit 120 including the supercooled coolant may additionally condense the refrigerant through the chiller 125. More particularly, the temperature of the coolant in the coolant circulation circuit entering the second cooling circuit 120 is set to a temperature of 20° C. or lower. The coolant may flow so that the temperature of the battery 176 reaches 20° C. in consideration of the charging efficiency of the battery 176. In addition, due to the chiller 125, the coolant flowing through the second cooling circuit 120 cools the refrigerant flowing through the air conditioning system 140. The cooling may be configured such that the refrigerant is not required to be additionally cooled by the thermal management system of the vehicle to cool the vehicle.

In other words, the air conditioning system 140 operated using the refrigerant and configured to absorb heat from the refrigerant in the chiller 125 by means of the coolant in the second cooling circuit 120 may activate the initial cooling mode by means of the supercooled coolant in the second cooling circuit 120 without consuming power. Thus, in an initial driving state of the vehicle that has been completed charged, the air conditioning system 140 may be driven using the cooled coolant in the coolant circulation line 300, circulated through the second cooling circuit 120, without additional driving force.

Figure 4:
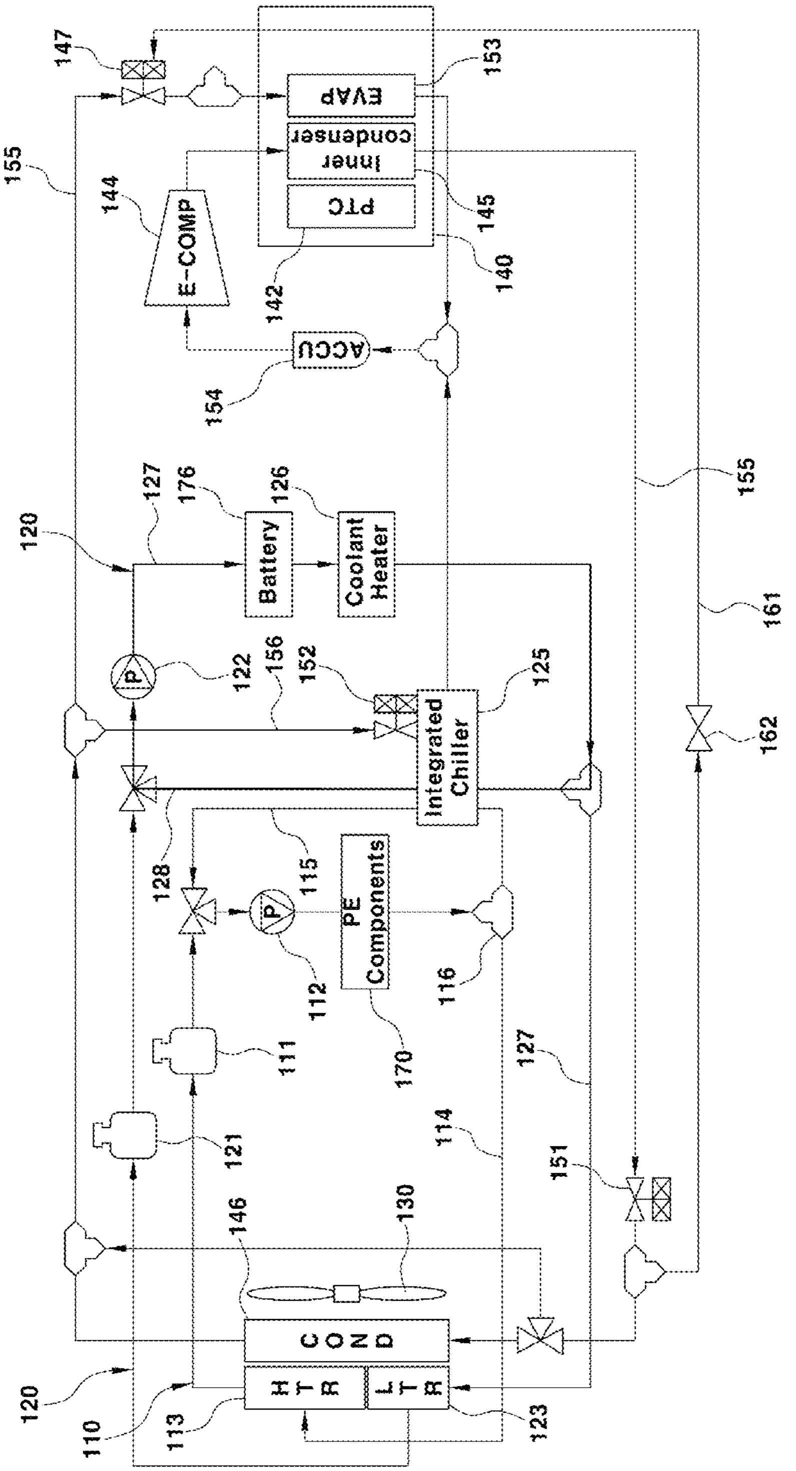
FIG. 4 illustrates a battery heating mode of the thermal management system according to a battery heating condition as a related-art example.

FIG. 4 illustrates flows of coolant when the thermal management system of the related art heats the battery when performing rapid charging.

As shown in FIG. 4, the coolant heater 126 is provided downstream of the battery 176 mounted on the vehicle. The second cooling circuit 120 is configured to flow the coolant through the battery 176 and the coolant heater 126 and circulate the coolant to the front end of the inlet of the battery 176 through the second bypass line 128. In other words, the controller applies power to the coolant heater 126 to increase the temperature of the battery and increases the temperature of the coolant discharged from the coolant heater 126. Thus, the temperature of the battery 176 is controlled to have a high charging efficiency temperature. Consequently, the amount of power applied to and consumed by the coolant heater 126 is increased, which is problematic.

Figure 5:
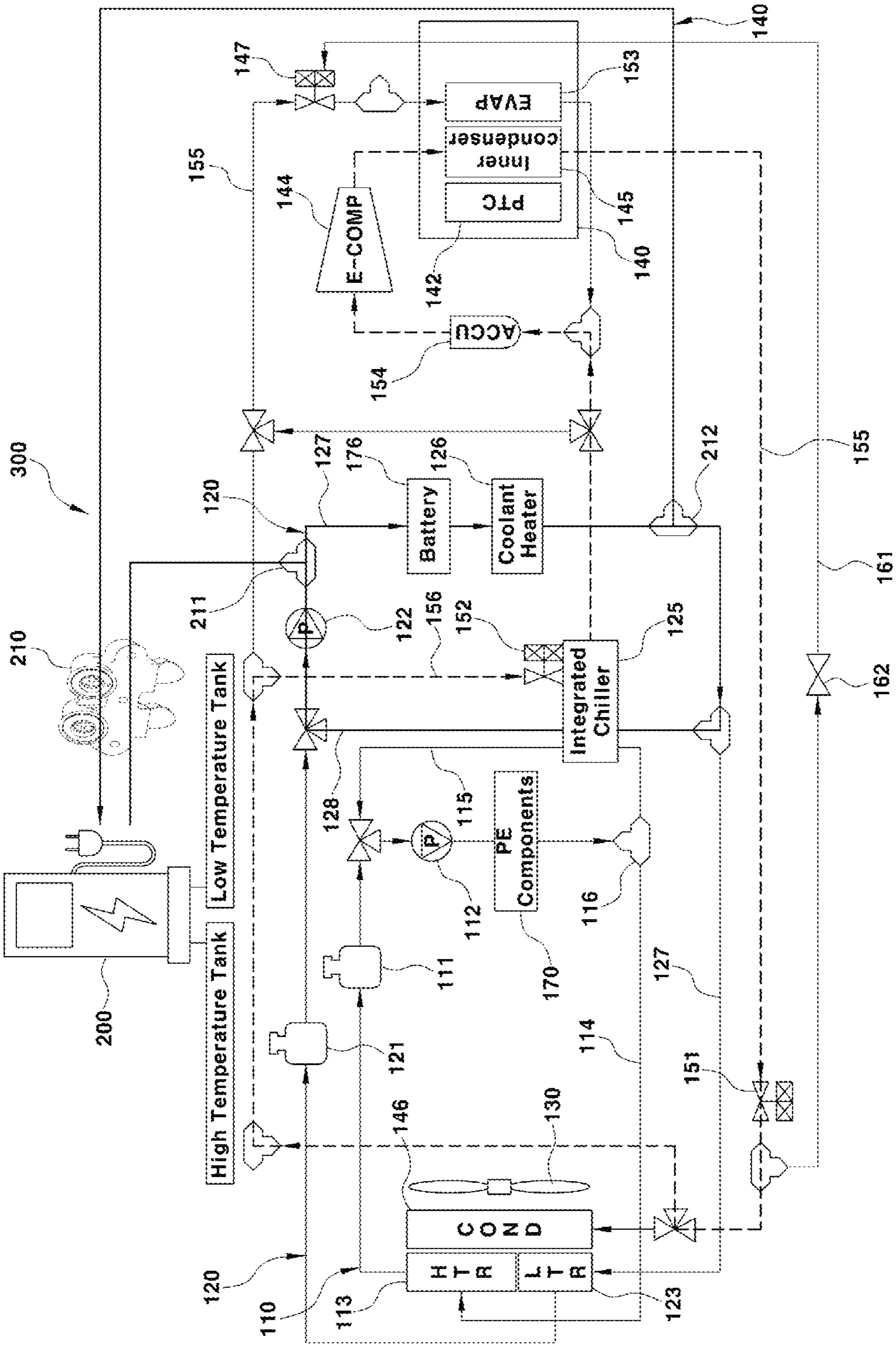
FIG. 5 illustrates the thermal management system heating the battery by charging with the coolant from the charging station according to an embodiment of the present disclosure.

In contrast, FIG. 5 illustrates a charged state of the vehicle to which the coolant is applied from the charging station 200 including the coolant circulation line 300 according to an embodiment of the present disclosure.

As shown in FIG. 5, the controller is set to receive an ambient temperature through an ambient temperature sensor. When the received ambient temperature is lower than the second set temperature, control the coolant flowing through the coolant circulation line 300 to be overheated. Afterwards, the coolant circulation line 300 of the charging station 200 and the second cooling circuit 120 of the vehicle are fluid-connected by the connector 210. The coolant in the coolant circulation line 300 flows through the connector inlet 211 positioned upstream of the battery 176 and the connector outlet 212 positioned downstream of the coolant heater 126.

More particularly, a circulation line is formed such that the overheated coolant entering through the connector inlet 211 flows through the second cooling circuit 120 including the battery 176 and re-enters the battery 176 through the second bypass line 128.

At the same time, the refrigerant passing through the air conditioning system 140 flows through the chiller 125. The refrigerant sequentially circulates through the chiller 125, the accumulator 154, the compressor 144, and the inner condenser 145 while bypassing the outer condenser 146. In other words, the overheated coolant circulating through the second cooling circuit 120 performs heat exchange with the refrigerant through the chiller 125. The refrigerant receives heat from the coolant having a higher temperature. Thus, in heating according to the driving environment during or after the charging of the vehicle, the temperature of the refrigerant is increased using the injected overheated coolant in a state in which additional power for heating the refrigerant is not required.

In other words, the temperature of the coolant entering the front end of the battery 176 through the connector inlet 211 is set to heat the battery 176 to a temperature of 30° C. or higher. Furthermore, the entering coolant transfers heat to the refrigerant through the chiller 125, thereby allowing the air conditioning system 140 to heat the vehicle interior space.

In this manner, the chiller 125 is configured to enable heat exchange between the high-temperature coolant entering from the coolant circulation line 300 circulating through the second cooling circuit 120 and the refrigerant flowing through the air conditioning system 140. The air conditioning system 140 serving to heat the vehicle is configured to perform the heating at a high temperature without consuming additional power.

As described above, the present disclosure is configured to easily heat the battery 176 to a temperature range corresponding to the charging efficiency temperature of the battery 176 in the case of rapid charging, in comparison to the thermal management system of the related art. Furthermore, the present disclosure is configured to perform heat transfer to the air conditioning system 140 through the chiller 125 to which heat is transferred from the coolant in the second cooling circuit 120.

Figure 6:
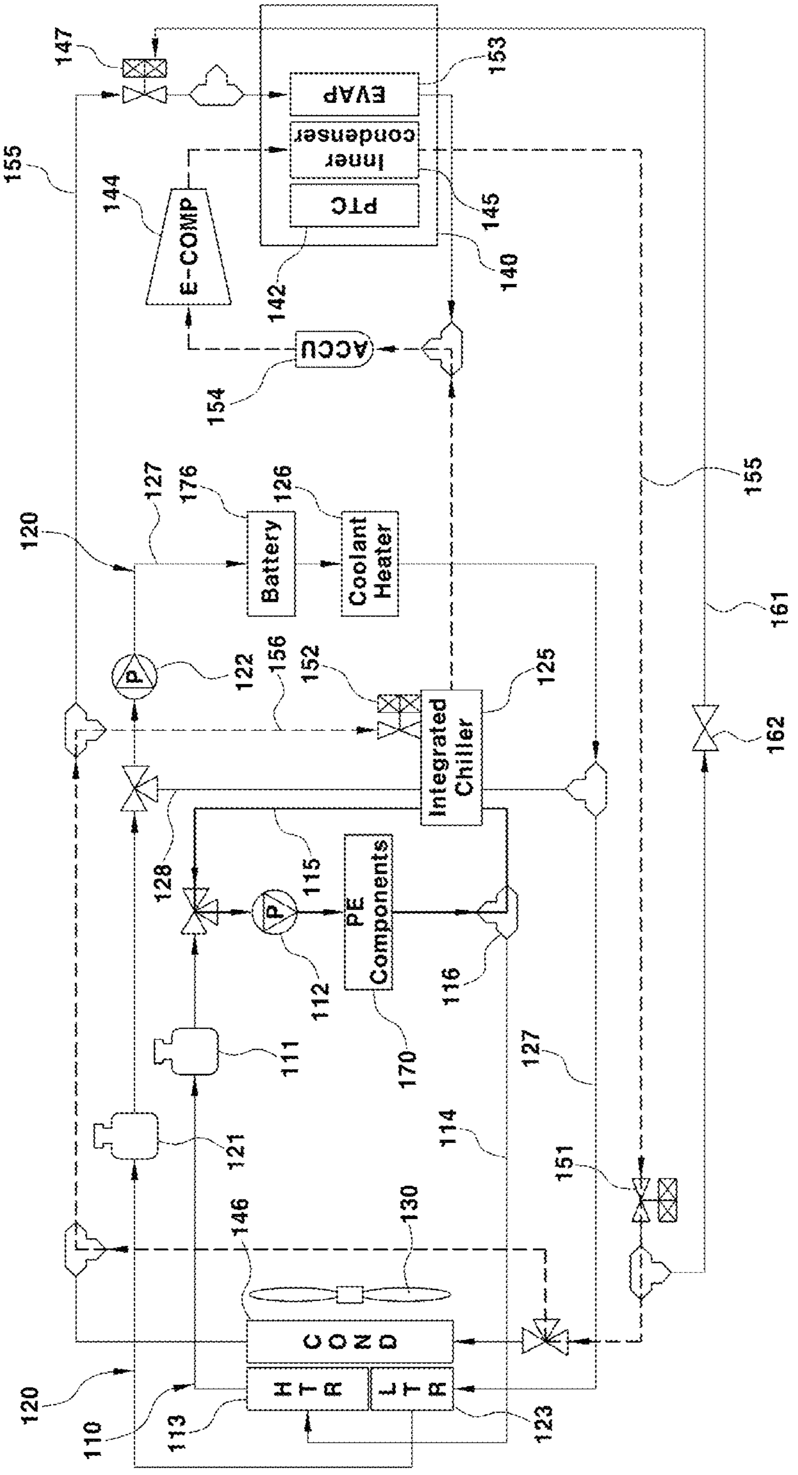
FIG. 6 illustrates the thermal management system in a heating mode during driving after the battery is heated as a related-art example.

Next, FIG. 6 illustrates an operating state of the thermal management system of the related art in the vehicle heating mode during driving of the vehicle after completion of the charging. The operation of the thermal management system during driving of the vehicle after rapid charging for heating the battery 176 is illustrated.

As shown in FIG. 6, in the heating mode, the coolant circulates through the first cooling circuit 110 and the second cooling circuit 120. Through this circulation of the coolant, the PE components, such as the front wheel inverter, the rear wheel inverter, the OBC, the LDC, the front wheel motor, the rear wheel motor, and the battery 176 are cooled. In addition, in the heating mode, the inner heater 142 may be selectively operated. In the operation of the inner heater 142, the air blown by the air conditioning blower may be heated by the inner heater 142 before being injected into the vehicle interior space, thereby heating the vehicle interior space.

In addition, the compressor 144 operates to circulate the refrigerant through the refrigerant line 155 during the heating mode. The refrigerant sequentially circulates through the compressor 144, the inner condenser 145, the outer condenser 146, the chiller 125, the accumulator 154, and the compressor 144 again. In the heating mode, the refrigerant compressed into the high-temperature and high-pressure state by the compressor 144 performs heat exchange with the air blown by the air conditioning blower while passing through the inner condenser 145. The air heated by the refrigerant in the high-temperature and high-pressure state is discharged into the vehicle interior space, thereby heating vehicle interior space.

Alternatively, the heat exchange system of the related art may be configured such that the refrigerant sequentially circulates through the inner condenser 145, the chiller 125, the accumulator 154, and the compressor 144, and that heat exchange occurs between the coolant in the first cooling circuit 110, which has cooled the PE components 170, and the refrigerant to provide heating to the air conditioning system 140. In other words, after heat exchange through the integrated chiller 125, the refrigerant is compressed into a high-temperature and high-pressure state by the compressor 144 and then supplied to the inner condenser 145. The air-conditioning air passing through the inner condenser 145 is thereby heated. As described above, in the heating mode, the vehicle interior space may be heated using waste heat recovered from the PE components 170.

Figure 7:
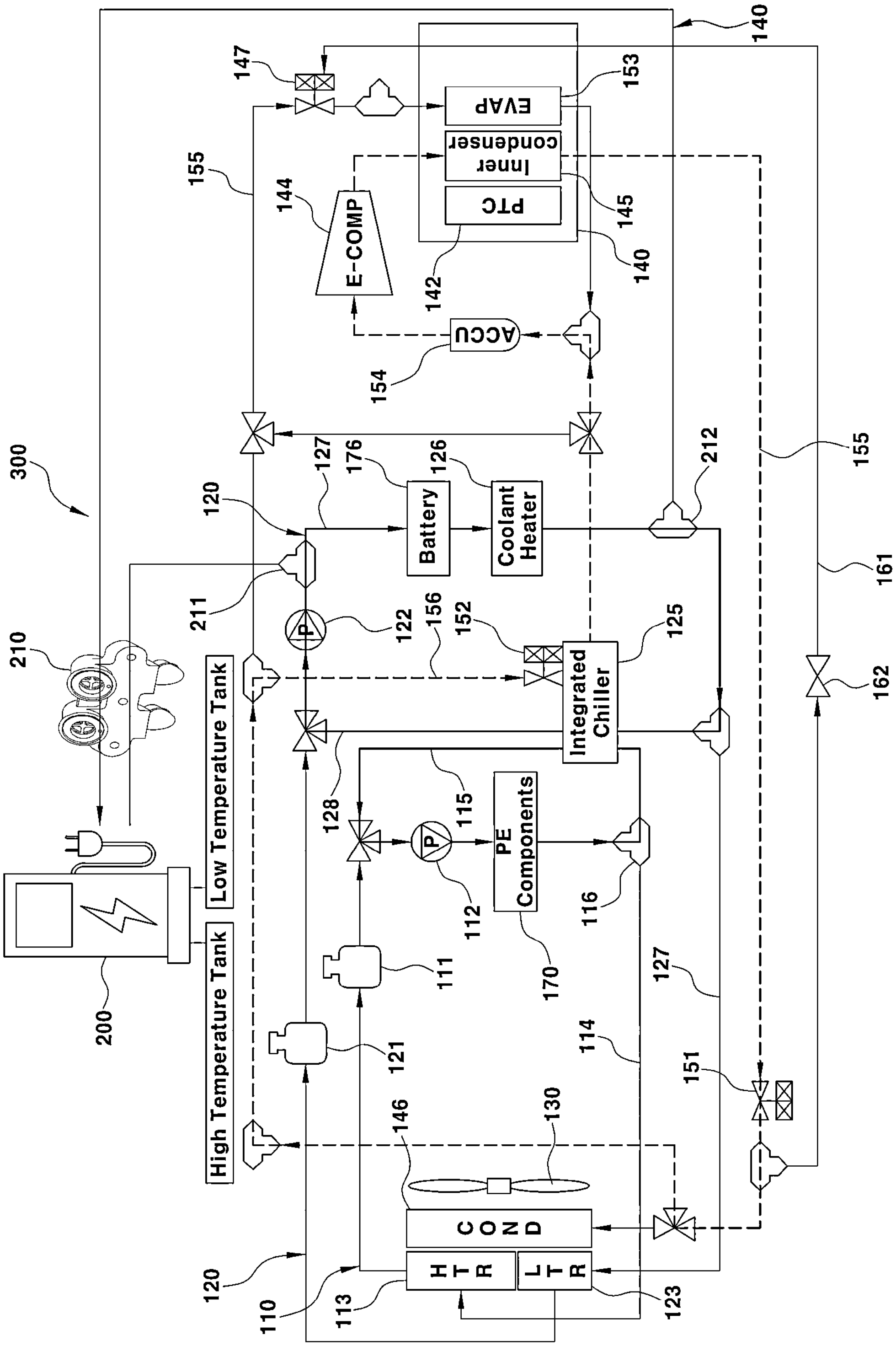
FIG. 7 illustrates flows of the heating mode of the thermal management system during driving after the battery is heated using the coolant from the charging station, according to an embodiment of the present disclosure.

In contrast, FIG. 7 illustrates flows of the heating during driving of a vehicle rapidly charged by heating the battery using the thermal management system according to the present disclosure.

As shown in FIG. 7, in the electric vehicle that has completed rapid charging of the battery through the charging station 200, the second cooling circuit 120 may maintain a state in which the overheated coolant flows at the initial stage of driving of the vehicle. In addition, the coolant flows in the first cooling circuit 110 to cool the PE components 170, and the state in which the overheated coolant flows is maintained. Thus, the refrigerant passing through the chiller 125 receives heat from the coolant flowing through the first cooling circuit 110 and the second cooling circuit 120. The refrigerant having a relatively high-temperature state is thereby allowed to enter the air conditioning system 140.

More particularly, heat is transferred from the cooling circuits 110 and 120 to the refrigerant through the chiller 125. A refrigerant circulation line bypassing the outer condenser 146 may be formed. The refrigerant may sequentially flow through the chiller 125, accumulator 154, the compressor 144, and the inner condenser 145.

In other words, waste heat from the PE components 170 of the first cooling circuit 110 and heat contained in the coolant having a relatively high temperature, which has entered the second cooling circuit 120 through the coolant circulation line 300 of the charging station 200, may be transferred to the refrigerant through the chiller 125. During driving of the electric vehicle rapidly charged in the temperature increase condition, additional power for heating the vehicle interior space may not be required.

As described above, according to the present disclosure, the supercooled or overheated coolant in the coolant circulation line 300 of the charging station 200 enters the second cooling circuit 120 of the vehicle to cool or heat the battery 176 in response to the electric vehicle being rapidly charged by the charging station 200. In setting of the cooling mode or the heating mode of the vehicle, the charging of which is completed, the thermal management system increases the efficiency of heat exchange with the refrigerant using the entered coolant. Thus, while the vehicle is being charged or is driving after being charged, the cooling mode or the heating mode may be performed by driving the air conditioning system 140 using the cooled or heated refrigerant. High efficiency thermal management is thereby provided.

The technical concept of the present disclosure has been described in connection with what are presently considered to be practical embodiments. Although the embodiments of the present disclosure have been described, the present disclosure may be also used in various other combinations, modifications, and environments. In other words, the present disclosure may be changed or modified within the range of the concepts of the embodiments disclosed in the specification, the range equivalent to the disclosure, and/or the range of the technology or knowledge in the field to which the present disclosure pertains. The embodiments described above have been provided to explain the best state in carrying out the present disclosure. Therefore, the embodiments may be carried out in other states known to the field to which the present disclosure pertains and also may be modified in various forms required in specific application fields and usages of the disclosure. Therefore, it should be understood that the disclosure is not limited to the disclosed embodiments. It should also be understood that other embodiments are also included within the spirit and scope of the appended claims.

What is claimed is:

1. A thermal management system for electric vehicles, the thermal management system comprising: a coolant circulation line provided in a charging station and containing therein a coolant having a predetermined temperature; a connector connecting the coolant circulation line and a cooling system of a vehicle; and a controller receiving an ambient temperature of the vehicle, wherein the controller is configured to control the coolant circulation line of the charging station to be fastened to the cooling system of the vehicle so that the coolant in the charging station enters the cooling system through the connector when a battery of the vehicle is rapidly charged; control the coolant overheated or supercooled to the predetermined temperature to be supplied to the vehicle according to a cooling condition or a heating condition of the battery while the vehicle is being charged through the connector; and activate a cooling mode or a heating mode of the vehicle using heat exchange between the coolant entering the vehicle through the coolant circulation line and the cooling system; wherein the controller is configured to selectively connect between the coolant circulation line of the charging station and the cooling system of the vehicle.

2. The thermal management system of claim 1, wherein the cooling system comprises:

a first cooling circuit configured to cool power electronic components;

a second cooling circuit configured to allow the coolant entering the battery to flow; and an air conditioning system through which a refrigerant circulates.

3. The thermal management system of claim 2, further comprising a chiller provided in the air conditioning system and configured to perform heat exchange among the coolant in the first cooling circuit, the coolant in the second cooling circuit, and the refrigerant in the air conditioning system.

4. The thermal management system of claim 2, wherein the controller is configured to activate the cooling mode by performing heat transfer from the refrigerant to the second cooling circuit during driving of the vehicle after the battery is cooled through the coolant circulation line when the battery of the vehicle is charged.

5. The thermal management system of claim 2, wherein the controller is configured to activate the heating mode by performing heat transfer from the second cooling circuit to the refrigerant during driving of the vehicle after the battery is heated through the coolant circulation line when the battery of the vehicle is charged.

6. The thermal management system of claim 2, wherein a power electronic component provided in the first cooling circuit comprises at least one among a front wheel motor, a rear wheel motor, a front wheel inverter, a rear wheel inverter, an on-board charger, and a low voltage direct current to direct current (DC-DC) converter.

7. The thermal management system of claim 1, wherein the controller is configured to receive a temperature of the battery in the vehicle and set a temperature of the coolant in the coolant circulation line in response to the received temperature of the battery.

8. The thermal management system of claim 1, wherein the controller is configured to receive the ambient temperature of the vehicle and, when the received ambient temperature of the vehicle is higher than the predetermined temperature, supercool the coolant in the coolant circulation line before injecting the coolant into the vehicle.

9. The thermal management system of claim 1, wherein the controller is configured to receive the ambient temperature of the vehicle and, when the received ambient temperature of the vehicle is lower than a second predetermined temperature, overheat the coolant in the coolant circulation line before injecting the coolant into the vehicle.

10. The thermal management system of claim 1, further comprising a low-temperature tank and a high-temperature tank on the coolant circulation line, the supercooled coolant being contained in the low-temperature tank and the overheated coolant being contained in the high-temperature tank, wherein the controller is configured to set a temperature of the coolant according to the ambient temperature.

* * * * *